United States Patent Office 3,595,940
Patented July 27, 1971

3,595,940
GRAFT COPOLYMERS AND PROCESS FOR THEIR MANUFACTURE
Gerhard Kuhne and Jurgen Kuhls, Burghausen, Salzach, Germany, assignors to Farbwerke Hoechst Aktiengesellschaft vormals Meister Lucius & Bruning, Frankfurt am Main, Germany
No Drawing. Filed Oct. 29, 1968, Ser. No. 771,605
Claims priority, application Germany, Nov. 17, 1967, P 17 20 750.0
Int. Cl. C08f 29/24, 19/08, 19/10
U.S. Cl. 260—876                                    8 Claims

ABSTRACT OF THE DISCLOSURE

The present invention relates to crystal clear graft copolymers of high impact strength and their manufacture by polymerizing vinyl chloride to an extent of polymerization of 50 to 85%, then adding an elastomer latex obtained from butadiene, styrene and vinyl esters, in an amount within the range of from 1 to 30% by weight calculated on the vinyl chloride and finally continuing the polymerization of the whole mixture.

The resulting graft copolymers can be used either alone or in admixture with suspension or mass polyvinyl chloride for making crystal clear shaped articles of high notched impact tensile strength.

---

The present invention relates to graft copolymers and a process for their manufacture.

It has already been proposed to make impact-resistant and simultaneously crystal clear moulding masses from thermoplasts, for example, polystyrene, polymethyl methacrylate or polyvinyl chloride, by combination of an elastomeric phase of low second order transition temperature and a rigid phase, that is a thermoplast, of high second order transition temperature, the optical refractive indices being exactly adjusted to one another. This method has been described, for example, in U.S. Pat. 1,445,206 and in German Auslegeschrift 1,127,086.

When carrying out the process in practice, the monomers from which the elastomer is built up must be polymerized with one another in a determined quantitative proportion which has to be strictly observed. Even with an elastomer content of, for example, only 7%, a difference in the refractive indices of a few per thousand leads to hazy graft copolymers. To obtain reproducible refractive indices it is furthermore necessary to exactly observe the polymerization conditions and the extent of conversion and, if one of the components or part of a component is introduced later, also the moment of introduction of the monomer component imparting compatibility. The said parameters influence the composition and structure and consequently the refractive index of the elastomer.

The present invention provides a process for the manufacture of crystal clear graft copolymers of high impact strength by polymerization of vinyl chloride in an aqueous emulsion with the addition of an elastomer latex based on butadiene, which comprises adding an elastomer latex obtained from butadiene, styrene and a vinyl ester with 4 to 8, advantageously 4 or 5, carbon atoms in an amount within the range of from 1 to 25% by weight, advantageously 6 to 8% by weight, calculated on the vinyl chloride, at a moment at which the polymerization of the vinyl chloride has reached an extent of 50 to 85% and then continuing the polymerization of the whole mixture.

In accordance with the invention an elastomer built up from butadiene, styrene and a vinyl ester, for example, vinyl acetate or vinyl propionate or mixtures of such esters, may be used which is advantageously obtained by the following special technique:

40 to 70 parts by weight of butadiene are, for example, copolymerized in an aqueous emulsion with 13 to 40 parts by weight of styrene and into the reaction zone in which the polymerization is being performed there are introduced at an extent of conversion of 30 to 70% 2 to 20 parts by weight of vinyl acetate as graft component. Alternatively 40 to 70 parts by weight of butadiene may be copolymerized, for example, with 20 to 45 parts by weight of styrene in an aqueous emulsion and 2 to 15 parts by weight of vinyl acetate may be grafted on the trunk of butadiene and styrene after the reaction has been finished.

The resulting elastomer latex is introduced in a second stage into a reaction zone in which vinyl chloride is being emulsion polymerized, the introduction being made when the conversion of vinyl chloride has reached an extent of 50 to 85%, and the polymerization of the vinyl chloride is then continued.

In contrast to elastomers of similar structure, in which even slight deviations from the refractive index of polyvinyl chloride ($n_D^{20}=1.5400$) lead to hazy graft copolymers, no haze is observed in the graft copolymers of the invention even with a relatively large deviation of the refractive index as shown in the table below.

The graft copolymers in accordance with the invention may be shaped either alone or in admixture with suspension or mass polyvinyl chloride by the processes commonly used for shaping thermoplastic masses to obtain crystal clear shaped articles which are distinguished by a high notched impact tensile strength.

The moulding materials of the invention are excellently suited for bottles which may also be filled with foodstuffs and luxury food.

In the following table, Nos. 1 to 5 are elastomer latices obtained by the known art. Nos. 6 to 11 are elastomer latices in accordance with the invention. The table also indicates the test results obtained on graft copolymers having an elastomer content of 7% by weight. As supplement, the values for pure mass and suspension polyvinyl chloride have been indicated at the bottom of the table.

Of the first group of numbers, elastomer latex No. 5 attains almost the same refractive index as polyvinyl chloride, whereas elastomer latices Nos. 1 to 4, having deviating refractive indices, yield considerably poorer values of haze number. Contrary thereto, the elastomer latices Nos. 6 to 11 in accordance with the invention yield substantially equivalent haze numbers in the immediate vicinity of the haze number of polyvinyl chloride.

TABLE

| | Elastomer latex | | Graft copolymer with an elastomer content of 7% by weight | | |
|---|---|---|---|---|---|
| No. | Monomers used in parts by weight | Optical refractive index $n$ | Haze Number | Factor of toughness [2] | Notched impact tensile strength kp.cm./cm.$^2$ |
| 1 | 52 butadiene,[1] 31 styrene, 17 methyl, methacrylate. | 1.5350 | 250 | 32 | 144 |
| 2 | 40 butadiene,[1] 32 styrene, 28 methyl methacrylate. | 1.5280 | 350 | 28 | 150 |
| 3 | 30 butadiene, 54 chloroprene, 6 2,3-dichloro-butadiene, 10 acrylonitrile. | 1.5348 | 245 | 41 | 160 |
| 4 | 70 butadiene, 25 vinylidene chloride, 5 methyl methacrylate. | 1.529 | 340 | 33 | 156 |
| 5 | 52 butadiene,[1] 31 styrene, 17 methyl methacrylate. | 1.5395 | 110 | 32 | 160 |
| 6 | 64 butadiene, 32 styrene, 4 vinyl acetate. | 1.5410 | 105 | 33 | 136 |
| 7 | 60 butadiene, 34 styrene, 6 vinyl acetate. | 1.5472 | 110 | 39 | 140 |
| 8 | 60 butadiene,[1] 34 styrene, 6 vinyl acetate. | 1.5407 | 110 | 30 | 104 |
| 9 | 60 butadiene,[1] 34 styrene, 6 vinyl acetate. | 1.5445 | 112 | 27 | 161 |
| 10 | 52 butadiene,[1] 34 styrene, 14 vinyl acetate. | 1.5478 | 108 | 34 | 157 |
| 11 | 53 styrene, 57 butadiene, 7.5 vinyl propionate, 2.5 vinyl acetate. | 1.542 | 108 | 33 | 82 |
| | 100 mass or suspension polyvinyl chloride. | 1.5400 | 100 | 17 | 32 |

[1] Obtained according to Example 1(a), the rest obtained according to Example 1(b).

[2] Factor of toughness = $\dfrac{\text{elongation at break (percent)} \cdot 1{,}000}{\text{impact tensile strength (kp.cm./cm.}^2)}$ The products indicated in the above table have been obtained by the process described in the following examples. The examples serve to illustrate the invention, but are not intended to limit it. The parts are by weight.

EXAMPLES

(1) Preparation of elastomer latex (a) A solution of 150 parts of deionized water, 1 part of the sodium salt of dibutyl-naphthalene-sulfonic acid and 0.6 part of potassium persulfate was placed in an autoclave provided with stirring means. The air was displaced by introducing nitrogen and evacuated. 52 parts of butadiene and 34 parts of distilled styrene were then introduced under pressure while stirring and the temperature was raised to 55° to 60° C. After 5 hours of working, 0.5 part of dodecylbenzene sulfonate, and after 12 hours 14 parts of distilled vinyl acetate were added. After about 20 hours, the reaction was terminated and about 90 to 92% of the monomers had been reacted. The remaining proportion of unreacted monomers was removed at 40° C. under reduced pressure. The polymer concentration in the latex so obtained was about 35%.

(b) A solution of 150 parts of deionized water, 1 part of the sodium salt of dibutyl-naphthalene-sulfonic acid and 0.6 part of potassium persulfate was placed in an autoclave provided with stirring means. The air was displaced by introducing nitrogen and evacuated. 60 parts of butadiene and 34 parts of distilled styrene were then introduced under pressure while stirring and the temperature was raised to 55° to 60° C. After working for 5 hours, 0.5 part of dodecylbenzene sulfonate was added. After about 14 hours, the reaction was terminated. 6 parts of distilled vinyl acetate were added and the mixture was completely polymerized within a further 15 hours. The remaining parts of monomers were removed at 40° C. under reduced pressure. The polymer concentration of the latex so obtained was about 35%.

(2) Preparation of graft copolymer

A solution of 120 parts of deionized water, 0.4 part of the sodium salt of a sulfosuccinic acid ester, 0.3 part of the sodium salt of a long-chain alkyl sulfonic acid with 12 to 16 carbon atoms and 0.01 part of potassium persulfate was placed in an autoclave provided with stirring means and 100 parts of vinyl chloride were then added while stirring. After displacing the air with nitrogen, the reaction was started by heating. After an extent of conversion of about 60 to 70% had been reached, 20 parts, calculated on the vinyl chloride used (i.e. 7 parts calculated on the dry content) of the elastomer latex obtained as described above sub (a) or (b) were introduced within 15 minutes. The graft copolymer latex obtained after a reaction time of 15 hours and after reaching an extent of conversion of 90 to 92%, had a concentration of 40 to 42%.

What is claimed is:

1. A process for manufacturing crystal clear graft copolymers of high impact strength which comprises polymerizing vinyl chloride in an aqueous emulsion, adding an elastomer latex in an amount of from 1 to 30% by weight based on vinyl chloride to the aqueous emulsion when the polymerization of vinyl chloride has reached an extent of conversion of 50 to 85% and then continuing the polymerization of the whole mixture, said elastomer latex being obtained by copolymerizing 40 to 70 parts by weight butadiene with 13 to 40 parts by weight styrene in an aqueous emulsion and when the latter conversion has reached 30 to 70%, adding 2 to 20 parts by weight of a vinyl ester having 4 to 8 carbon atoms to the emulsion as a graft component and continuing the polymerization of the whole mixture.

2. A process for manufacturing crystal clear graft copolymers of high impact strength which comprises polymerizing vinyl chloride in an aqueous emulsion, adding an elastomer latex in an amount of from 1 to 30% by weight based on vinyl chloride to the aqueous emulsion when the polymerization of vinyl chloride has reached an extent of conversion of 50 to 80% and then continuing the polymerization of the whole mixture, said elastomer latex being obtained by copolymerizing 40 to 70 parts by weight butadiene with 20 to 45 parts by weight styrene in an aqueous emulsion and, after terminating the reaction, grafting 2 to 15 parts by weight of a vinyl ester having 4 to 8 carbon atoms onto the trunk of butadiene and styrene copolymer.

3. The process according to claim 1 wherein the vinyl ester is vinyl acetate or vinyl propionate or a mixture thereof.

4. The process according to claim 2 wherein the vinyl ester is vinyl acetate or vinyl propionate or a mixture thereof.

5. The process of claim 1 wherein the elastomer latex is added in an amount of 6 to 8% by weight calculated on the vinyl chloride.

6. The process of claim 2 wherein the elastomer latex is added in an amount of 6 to 8% by weight calculated on the vinyl chloride.

7. Crystal clear graft copolymers of high impact strength obtained by the process of claim 1.

8. Crystal clear graft copolymers of high impact strength obtained by the process of claim 2.

References Cited

UNITED STATES PATENTS

| | | | |
|---|---|---|---|
| 3,281,345 | 10/1966 | Kühne | 260—876X |
| 3,432,576 | 3/1969 | Beer | 260—876X |

FOREIGN PATENTS

| | | | |
|---|---|---|---|
| 1,120,416 | 7/1968 | Great Britain | 260—876 |

MURRAY TILLMAN, Primary Examiner

H. ROBERTS, Assistant Examiner

U.S. Cl. X.R.

206—46; 260—29.7, 879